United States Patent
Forster

(10) Patent No.: US 11,568,660 B1
(45) Date of Patent: Jan. 31, 2023

(54) SYSTEM AND METHOD FOR IMPROVING LOCALIZATION AND OBJECT TRACKING

(71) Applicant: Meta Platforms Technologies, Inc., Menlo Park, CA (US)

(72) Inventor: Christian Forster, Baar (CH)

(73) Assignee: Meta Platforms Technologies, LLC, Menlo Park, CA (US)

(*) Notice: Subject to any disclaimer, the term of this patent is extended or adjusted under 35 U.S.C. 154(b) by 303 days.

(21) Appl. No.: 17/031,690

(22) Filed: Sep. 24, 2020

Related U.S. Application Data

(63) Continuation of application No. 16/255,692, filed on Jan. 23, 2019, now Pat. No. 1,084,923.

(51) Int. Cl.
*G06V 30/262* (2022.01)
*G06K 9/62* (2022.01)
*G06V 20/00* (2022.01)

(52) U.S. Cl.
CPC ......... *G06V 30/274* (2022.01); *G06K 9/6256* (2013.01); *G06K 9/6262* (2013.01); *G06V 20/00* (2022.01)

(58) Field of Classification Search
CPC ... G06T 7/0014; G06T 19/006; G06V 30/274; G06V 20/00
See application file for complete search history.

(56) References Cited

U.S. PATENT DOCUMENTS

| | | | | |
|---|---|---|---|---|
| 8,036,425 | B2* | 10/2011 | Hou | G06V 20/52 348/169 |
| 8,107,704 | B2* | 1/2012 | Kanda | G06T 7/248 382/128 |
| 8,159,537 | B2* | 4/2012 | Itoh | G08B 13/19652 348/155 |
| 8,832,565 | B2* | 9/2014 | Nielsen | G06T 11/203 713/189 |
| 8,929,655 | B2* | 1/2015 | Takeuchi | H04N 21/4184 382/168 |
| 9,736,349 | B2* | 8/2017 | Yang | H04N 7/188 |
| 10,824,923 | B1* | 11/2020 | Forster | A63F 13/65 |

* cited by examiner

Primary Examiner — Yosef Kassa
(74) Attorney, Agent, or Firm — Baker Botts L.L.P.

(57) ABSTRACT

In one embodiment, a computing system is configured to, during a first tracking session, detect first landmarks in a first image of the environment surrounding a user, and determine a first location of the user by comparing detected first landmarks to a landmark database. During a second tracking session, the computing system captures motion data and estimates a second location of the user based on the motion data and first user location. Based on the motion data and first user location, the computing system detects landmarks in a second image at a second location. The system accesses expected landmarks from the landmark database visible at the second location and determines the estimated second location of the user is inaccurate by comparing the expected landmarks with the second landmarks. The computing system re-localizes the user by comparing the landmarks in the landmark database and third landmarks in a third image.

20 Claims, 10 Drawing Sheets

SYSTEM AND METHOD FOR IMPROVING LOCALIZATION AND OBJECT TRACKING

PRIORITY

This application is a continuation under 35 U.S.C. § 120 of U.S. patent application Ser. No. 16/255,692, filed 23 Jan. 2019.

FIELD OF THE INVENTION

This disclosure relates to the field of computer image processing, and more particularly to a technique for image-based localization and object tracking.

BACKGROUND

A feature map has been commonly used for computer graphic in a three-dimensional (3D) space, especially in artificial reality experiences (e.g., augmented reality (AR) and virtual reality (VR)), video games, virtual dressing rooms, etc. The feature map can be calculated with a stereo image (stereo pair). Often, the feature map may provide depth information in a 3D space to create a 3D image or to identify a relative position of an object within a 3D environment, out of a flat 2D picture. The relative positions of the objects may be used for creating virtual realism that viewers have come to expect in the real world. For example, to create a virtual scene, a computing device may track the relative positions of the objects in the 3D space and render virtual contents based on 3D models of their corresponding structures on the objects in the real world.

A mobile computing device, such as a smartphone, tablet computer, or laptop computer, may include functionalities for determining its location, direction, or orientation, using motion sensors such as a GPS receiver, compass, gyroscope, or accelerometer. Such a device may also include functionalities for wireless communication including BLUETOOTH communication, near-field communication (NFC), or infrared (IR) communication, or communication with a wireless local area networks (WLANs) or cellular-telephone network. Such a device may also include one or more cameras, scanners, touchscreens, microphones, or speakers. Mobile computing devices may also execute software applications, such as games, web browsers, AR/VR applications, or social-networking applications. With social-networking applications, users may connect, communicate, and share information with other users in their social networks.

SUMMARY OF PARTICULAR EMBODIMENTS

The subject matter described herein presents a tracking system using an automated process for updating a landmark database associated with a feature map of a scene/environment that is tracked. The system and method are designed for detecting landmarks of objects in the environment from real data capture, labeling the landmarks using semantic information by a deep-learning model, updating the landmark database associated with the feature map based on at least the landmarks and labels thereof, and using the updated landmark database for tracking, mapping, and re-localizing the objects of the environment. The re-localization process may identify a current location of the user and/or orientation of the user device based on the landmarks. Using the deep-learning model for labeling landmarks of the feature map with semantic information may improve accuracy of identifying objects in the environment. The tracking system and method using an up-to-date landmark database may avoid intensive computation of variety of search algorithms, operate faster and more accurately, and consume less power. As an example and not by way of limitation, those features may be desired for real-time tracking applications on mobile devices.

In particular embodiments, a deep-learning model may be trained to label landmarks from real data capture using a deep neutral network. The deep-learning model comprises modules that work jointly to label the landmarks with at least semantic information of the landmarks. The landmark database may be updated based on various factors determined by the landmarks and their labels.

Embodiments may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
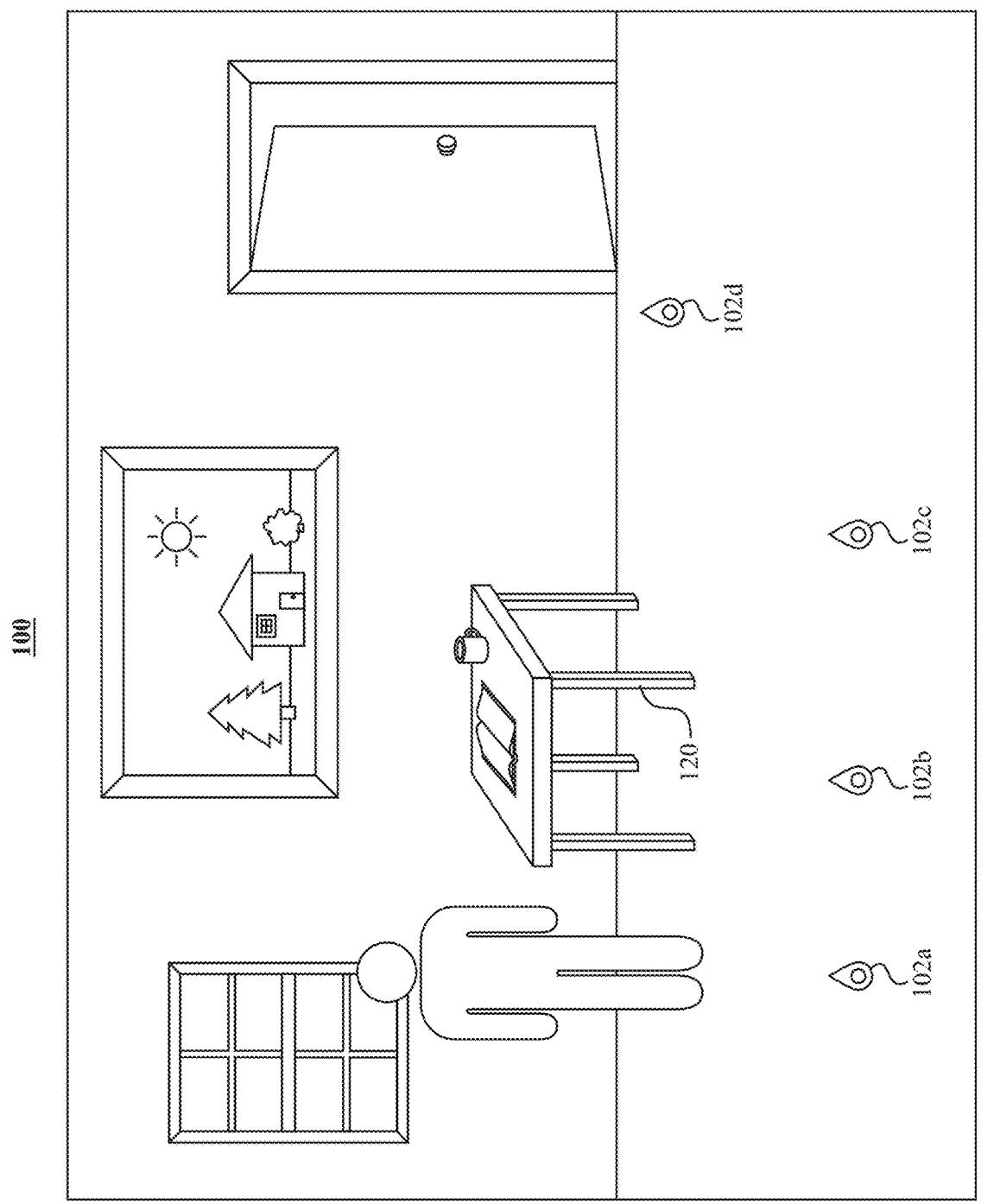
FIG. 1 illustrates an example of a scene in accordance with particular embodiments.

The feature map of an environment, often represented by point clouds, may provide three-dimensional (3D) information of the environment. Feature maps may be used by applications related to computer vision. Based on an image captured from a viewpoint in the environment, a system may recognize objects in the image and compute depth information to determine relative locations of the objects in the 3D space of the environment. With the accurate locations of the objects in the 3D space of the environment, the system may perform a variety of functions, such as tracking the objects of the environment, rendering AR contents on the objects, or following the device's movement in the environment, including velocity and/or altitude changes, the position and orientation of the device.

For example, an AR application may be configured to track objects in a scene or environment captured in an image, and render AR contents on the objects using the depth information. A feature map contains 3D information of the environment and may be generated using distance measurements of surfaces of objects (e.g., depth of the objects) in the scene as computed from a certain viewpoint. The feature map can be used to track the objects in a 3D space as the objects or the viewer moves, thereby allowing the AR contents to be rendered on the objects more accurately and realistically using the depth information of the objects and the relative position of the viewer/camera within the environment. A feature map may include groups or clusters of landmarks. Each group of landmarks is associated with an object that are known and saved in a database of the system based on previous measurements measured by sensors (e.g., cameras, depth sensors, inertial sensors.) The landmarks may include points, lines, planes, point cluster, or meshes, which may be detected using image-based 3D reconstruction algorithms, stereo camera, inertia sensors, depth sensors, or any other suitable components. Typically, the group of landmarks associated with an object may comprise prominent or detectable geometry elements that are observable from different viewing angles (e.g., corners of objects, points with high-contrast, etc.). From different viewpoints or the same viewpoint at different time, different groups of landmarks associated with the same object may be detected, indexed, and saved in a landmark database. The landmarks saved in the landmark databased may be associated and indexed with geographic locations at which they were detected. For example, a particular room in a house may be associated with a collection of landmarks of objects in that room and another room in the house may be associated with a different collection of landmarks. Additionally, a timestamp may be associated with groups of landmarks indicating the time when the groups of landmarks were detected. For example, a given room may have a collection of landmarks associated with day time and another collection of landmarks associated with night time, since the objects and/or the appearances of objects may be different at different times of day (e.g., there may be fewer shoes during the day than at night, and the detectability of certain features may be different depending on the ambient light source being the sun or a ceiling light). The landmarks in the landmark database may also be indexed in a particular data structure with respect to locations or timestamps.

Once created, the landmark database may be used to re-localize a viewer within an environment, in accordance with particular embodiments. For example, the first time the user uses a device (e.g., an AR/VR device) in a room, the device may perform an initialization process to obtain 3D data of the environment and store the data in the landmark database. For example, it may use image-based 3D reconstruction algorithms, simultaneous location and mapping (SLAM), stereo images, and/or depth sensors to compute the position and orientation of objects in the environment. The 3D data, which may be stored in the form of a point cloud, a set of line coordinates, plane coordinates, or meshes in particular embodiments, may represent a 3D model of the environment. The next time the user enters the room and turns on the device, the device would use the previously-stored 3D data to re-localize the user within the environment. For example, the next time the user enters the room, the device may identify observable landmarks (e.g., based on captured images, sensor data from the inertial measurement unit, etc.) and compare them with those stored in the landmark database. By finding a sufficiently close match (e.g., beyond a predetermined threshold) between the observed landmarks and a portion of the stored landmarks associated with that room and/or time, the device may determine where the user is located within that environment. The device may perform such localization determination continuously (e.g., on a per-frame basis) to track the user within the environment. The device may also use the landmark database to track movements of objects relative to the user or to each other.

The landmark database needs to be kept up-to-date to optimize the performance of the applications, such as shortening the time for localization or tracking and improving their accuracy. Embodiments described herein relate to a map health system that can assess and update the landmark database. The map health system may determine whether there are stale landmarks (e.g., indicating that the corresponding objects are no longer in the environment or unobservable) that should be deleted from the landmark database. As previously mentioned, the landmarks in the database of the system may be used for re-localizing and/or tracking objects. The landmarks in the database should accurately reflect objects in the environment. As such, stale landmarks may have a negative impact on the performance of the system. For example, in an AR application, virtual birthday candles may be rendered on a physical cake on a table. As the user moves around the table, the tracking application on the user device may track the cake from different viewpoints and accurately render the virtual birthday candles on the cake based on the depth information of the cake, which may be obtained from the feature map associated with the scene. When the cake has been consumed, the landmarks associated with the cake should be deleted from the landmark database. Keeping information associated with the now-eaten cake and tracking the landmarks thereof will be a waste of system resources, which may slow down tracking or locating other reliable objects in the environment, consume unnecessary power of the mobile device, or waste bandwidth of the network.

To update the landmark database, the system may identify expected landmarks from the landmark database with respect to the user's current location in the environment or a current time. When expected landmarks associated with an object are unobservable from the current viewpoint, the system may determine that the object does not exist in the environment anymore, and the corresponding landmarks would be deleted from the landmark database. However, in some scenarios, the objects may be temporarily blocked by other objects but still existed in the environment, in which case the associated landmarks should not be deleted from the landmark database. Thus, in particular embodiments, before removing expected landmarks in the database that are currently unobservable, the system may further require that those landmarks to be unobservable beyond a certain threshold duration and/or viewing positions. For example, if an expected landmark is unobservable for more than five seconds, the system may conclude that it is no longer present in the room or is now occluded by other objects, and delete that landmark from the database. On the other hand, if the expected landmark becomes observable less than five seconds, the system would not delete the landmark from the database since it may have been temporarily occluded by the user's hands or viewing angle. In addition, certain types of landmarks, which may be referred to as reliable landmarks, may remain in the database even if it is unobservable beyond the threshold criteria. For example, landmarks associated with unremovable objects (e.g., fixtures, windows, doors, etc.) may be determined as reliable objects (e.g., based on the semantic information thereof). Since the likelihood of such objects being removed from a room is low, the threshold for deleting the corresponding landmarks may be higher. For example, landmarks associated with reliable objects may remain in the landmark database even though they may be unobservable for a certain duration, from certain viewpoints or at a certain time. In particular embodiments, the landmarks associated with reliable objects may be deleted if they are continuously unobservable over longer durations or over multiple usage sessions of the device. In contrast to landmarks associated with reliable objects, landmarks that are associated with removable objects (e.g., books on the table) may be determined as unreliable objects (e.g., based on the semantic information thereof), and the associated landmarks may be deleted from the landmark database based on less stringent criteria (e.g., unobservable for more than five seconds). New landmarks may be added to the landmark database when new objects are present in an environment (e.g., captured by images or measured by depth sensors).

FIG. 1 illustrates an example of a scene in accordance with particular embodiments. An environment or a scene 100 may be captured in an image from a viewpoint of a user, who may use a mobile device (e.g., a smartphone or VR/AR headset with outward-facing cameras) for capturing images. The user may initiate the tracking application at an initial location 102a. The image may capture objects including a floor, a table on the floor, a notebook and a mug on the table, a wall, a painting on the wall, a window, and a door. The image captures 2D position information of the objects from a viewpoint at the location 102a, such as the relative position information between the window, the painting, the door, and the table. A visitor or visitors may walk around the scene 100 and be captured in the images.

The user may capture the real-time images of the scene 100 from different viewpoints at different locations, including the initial location 102a and subsequent locations 102b-102d, for example. In particular embodiments, a tracking session may be conducted to obtain 3D data of the environment based on images and other sensor data captured at each of the locations 102a-102d.

Figure 2:
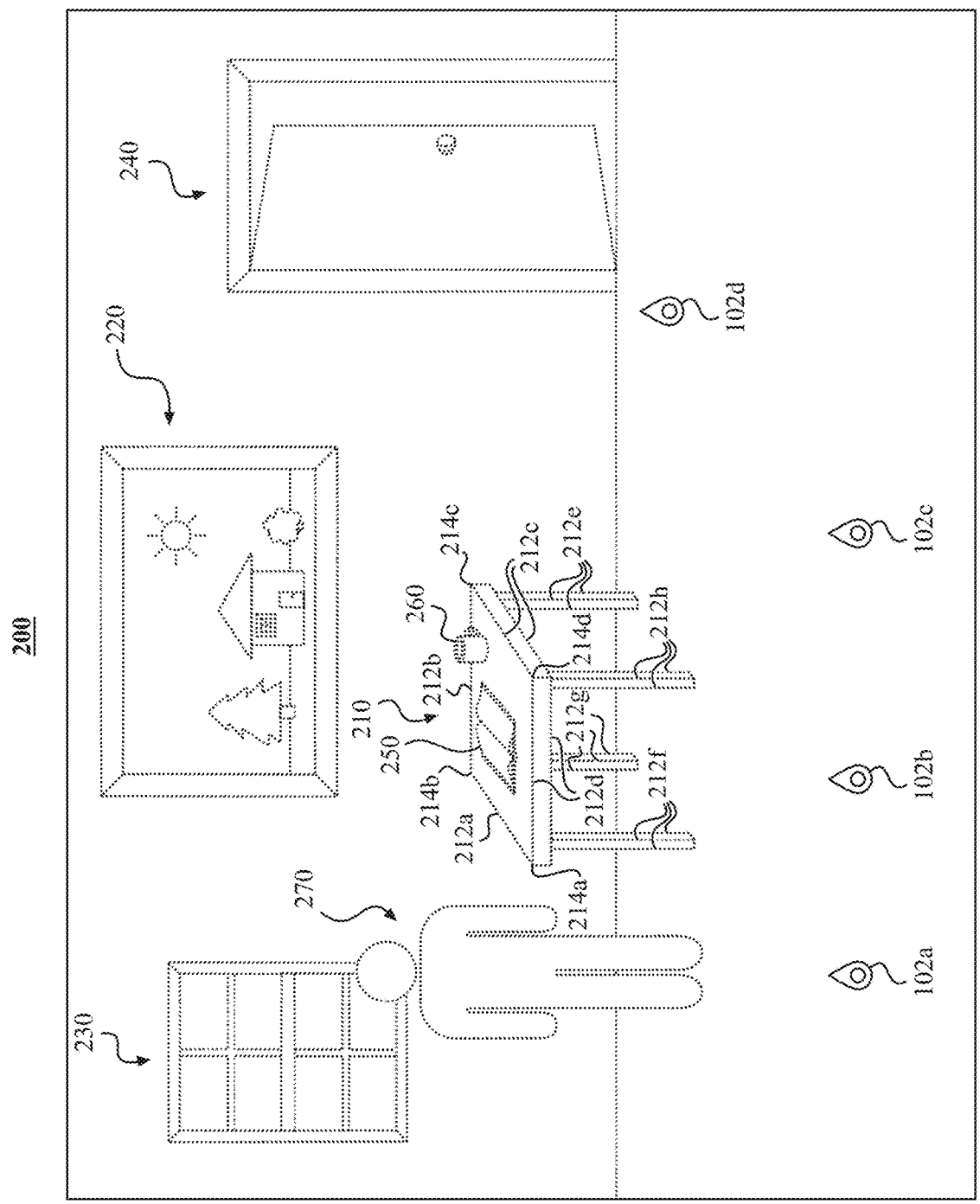
FIG. 2 illustrates an example of detected landmarks in a scene in accordance with particular embodiments.

FIG. 2 illustrates an example of detected landmarks in a scene in accordance with particular embodiments. FIG. 2 shows a pattern 200 of detected landmarks associated with objects in the scene 100 of FIG. 1. The system may detect landmarks (e.g., planes, lines, points/corners, or meshes) based on captured images or sensor data. Each group of the detected landmarks may be associated with one or more of the objects in the scene 100. For example, the system may capture an image of the scene 100, and the captured image may be analyzed to detect landmarks associated with the objects in the image. The pattern 200 may comprise clusters of detected landmarks (e.g., represented by landmark clusters 210, 220, 230, 240, 250, 260, and 270). The system may detect that the landmark cluster 210 is associated with the table in FIG. 1. The detected landmark cluster 210 may comprise a plurality of lines (e.g., lines 212a-212h associated with table legs) and corners 214a-214d that correspond to features of the table. Each of the lines 212a-212h may comprise a plurality of points. Similarly, the detected landmark cluster 220 may be associated with the painting, the landmark cluster 230 may be associated with the window, and the landmark cluster 240 may be associated with the door in FIG. 1. The detected landmark clusters 250, 260 and 270 may be associated with the notebook, the mug, and a visitor in FIG. 1, respectively. The pattern 200 of the detected landmarks may be associated with the viewpoint at the location 102a and/or a timestamp when the landmarks are detected. In a similar manner, landmarks may be detected based on image and sensor data captured at locations 102b, 102c, and 102d. Depending on the device's location (e.g., 102a, 102b, 102c, or 102d), different landmarks may be observable. For example, portions of the leg 212g of the table may be observable at location 102a but not 102c.

In particular embodiments, the landmarks can be detected from the viewpoint at a same location but with a different timestamp. For example, the landmarks can be detected from the same viewpoint at the same location (e.g., the location 102a), but at different time in different tracking sessions. The detected landmarks may be associated with a same viewpoint and different timestamps in the different tracking sessions. The expected landmarks may be retrieved from the landmark database with respect to the timestamps, and compared with the detected landmarks detected at the same time.

Figure 3:
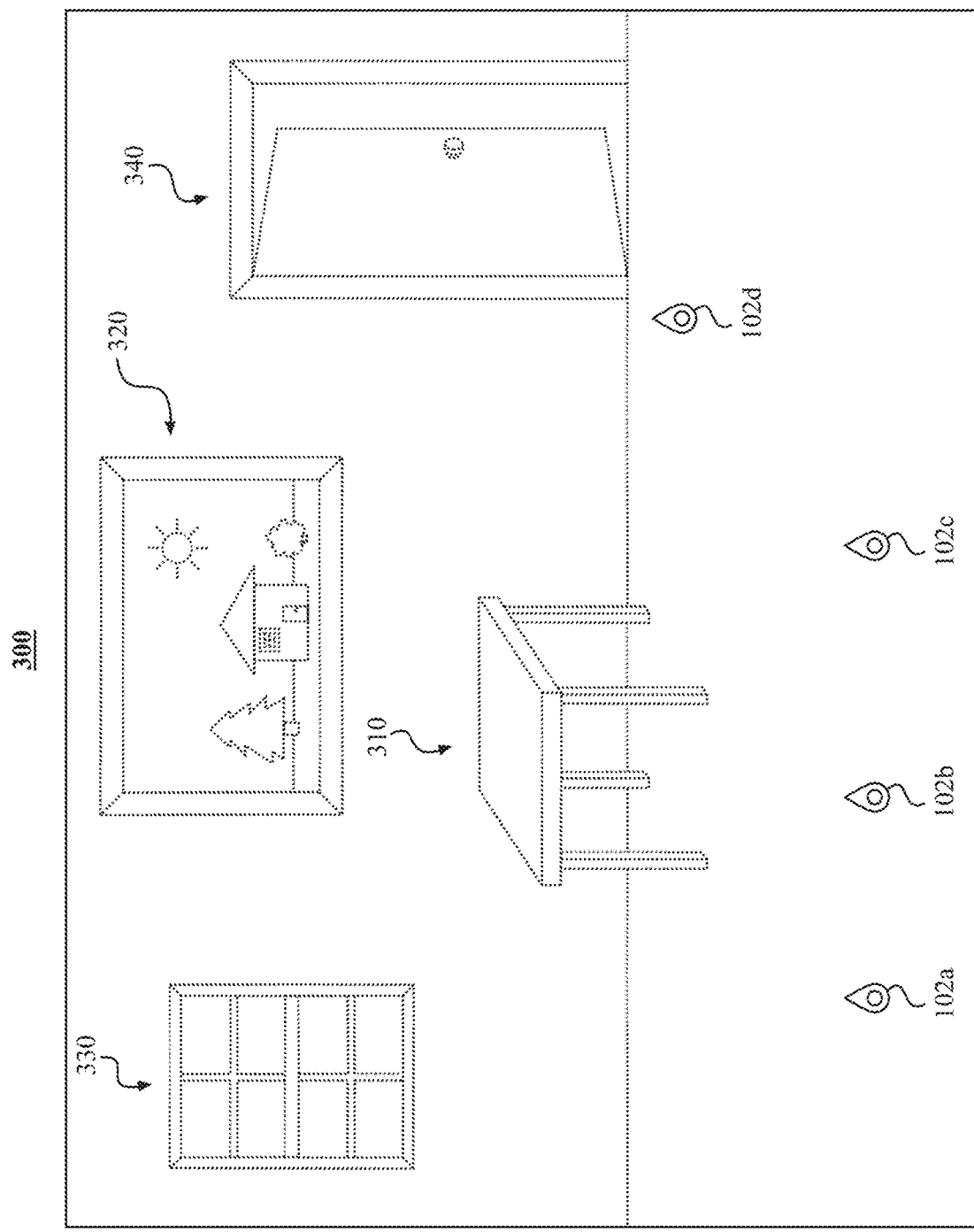
FIG. 3 illustrates an example of expected landmarks of a landmark database in accordance with particular embodiments.

FIG. 3 illustrates an example of expected landmarks of a landmark database in accordance with particular embodiments. A pattern 300 of expected landmarks may be determined with respect to the viewpoint at the location 102a based on the landmark database. The pattern 300 may comprise clusters 310, 320, 330, and 340 of landmarks associated with the table, painting, window, and door of FIG. 1, respectively. In particular embodiments, the pattern 300 of expected landmarks may be determined with respect to other indexes (e.g., a timestamp) based on the landmark database.

Upon knowing the user's current location (e.g., location 102a) within the environment using re-localization techniques, the system may identify which landmarks stored in the database are expected to be observable from location 102a. The expected landmarks in the landmark database may be compared with the currently detected or observable landmarks to determine whether (1) any of the expected landmarks is not currently observable, or (2) any of the detected landmarks is not currently in the landmark database.

In particular embodiments, with respect to the location 102a, the system may identify that landmark clusters 310, 320, 330, and 340 are expected to be seen from the location 102a based on the landmark database. The system may compare the detected landmarks (e.g., clusters 210, 220, 230, 240, 250, 260, and 270) in FIG. 2 with the expected landmarks (e.g., the clusters 310, 320, 330, and 340) in FIG. 3, and determine that all the expected landmark clusters are at least partially observable from the location 102a. For example, the expected landmark clusters 310, 320, and 340 are fully observable, and the expected cluster 330 is at least partially observable from the viewpoint at the location 102a. The system may determine that all the objects (e.g., the table, painting, window, and door) corresponding to the expected landmark clusters (e.g., the clusters 310, 320, 330, and 340) are still existed in the scene 100.

In particular embodiments, some of the expected landmarks are completely unobservable in the current scene. The system may determine that the objects associated with the completely unobservable expected landmarks are no longer existed in the scene, and the unobservable expected landmarks should be deleted from the landmark database. In other scenarios, the system may determine that the objects associated with the completely unobservable expected landmarks are still existed in the scene but temporarily occluded by other objects, and the unobservable expected landmarks should not be deleted from the landmark database.

In particular embodiments, the system may determine that some of the detected landmarks are new and not currently in the landmark database, and the newly detected landmarks may be added to the landmark database. For example, the detected clusters 250, 260, and 270 associated with the notebook, the mug, and the visitor are not included in the landmark database, and the system may update the landmark database by adding the newly detected landmarks (e.g., the clusters 250, 260, and 270) into the landmark database.

Figure 4:
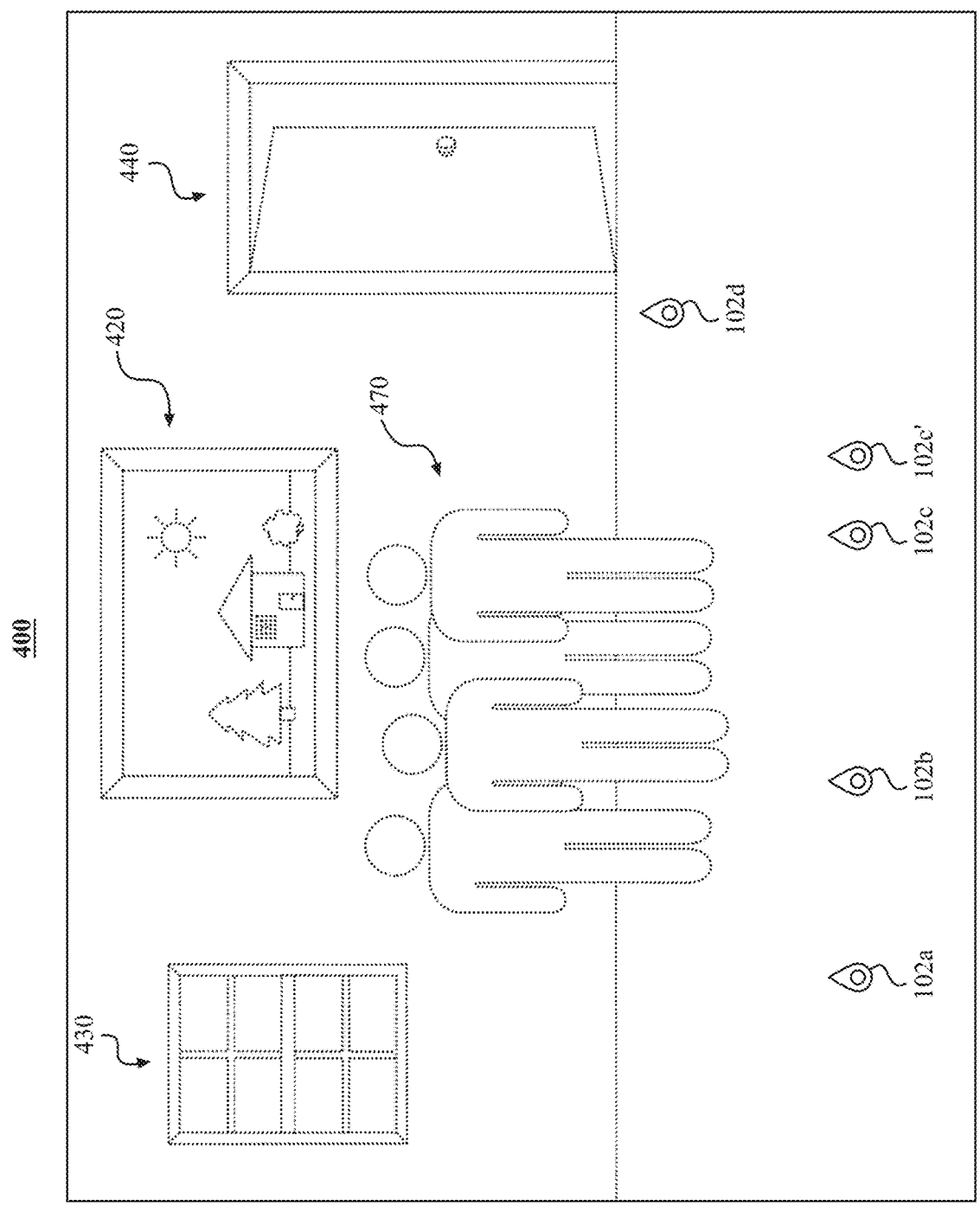
FIG. 4 illustrates another example of detected landmarks in a scene in accordance with particular embodiments.

FIG. 4 illustrates another example of detected landmarks in a scene in accordance with particular embodiments. From the viewpoint at the location 102c, the detected landmarks may comprise clusters of detected landmarks (e.g., clusters 420, 430, 440, and 470) that are associated with the location 102c and/or a timestamp when the landmarks are detected. The system may detect the cluster 420 associated with the painting, the cluster 430 associated with the window, and the cluster 440 associated with the door in FIG. 1. The detected clusters 470 may be associated with a crowd of visitors who stand in front of the painting and completely block the table and the objects on the table from the viewpoint at the location 102c.

Figure 5:
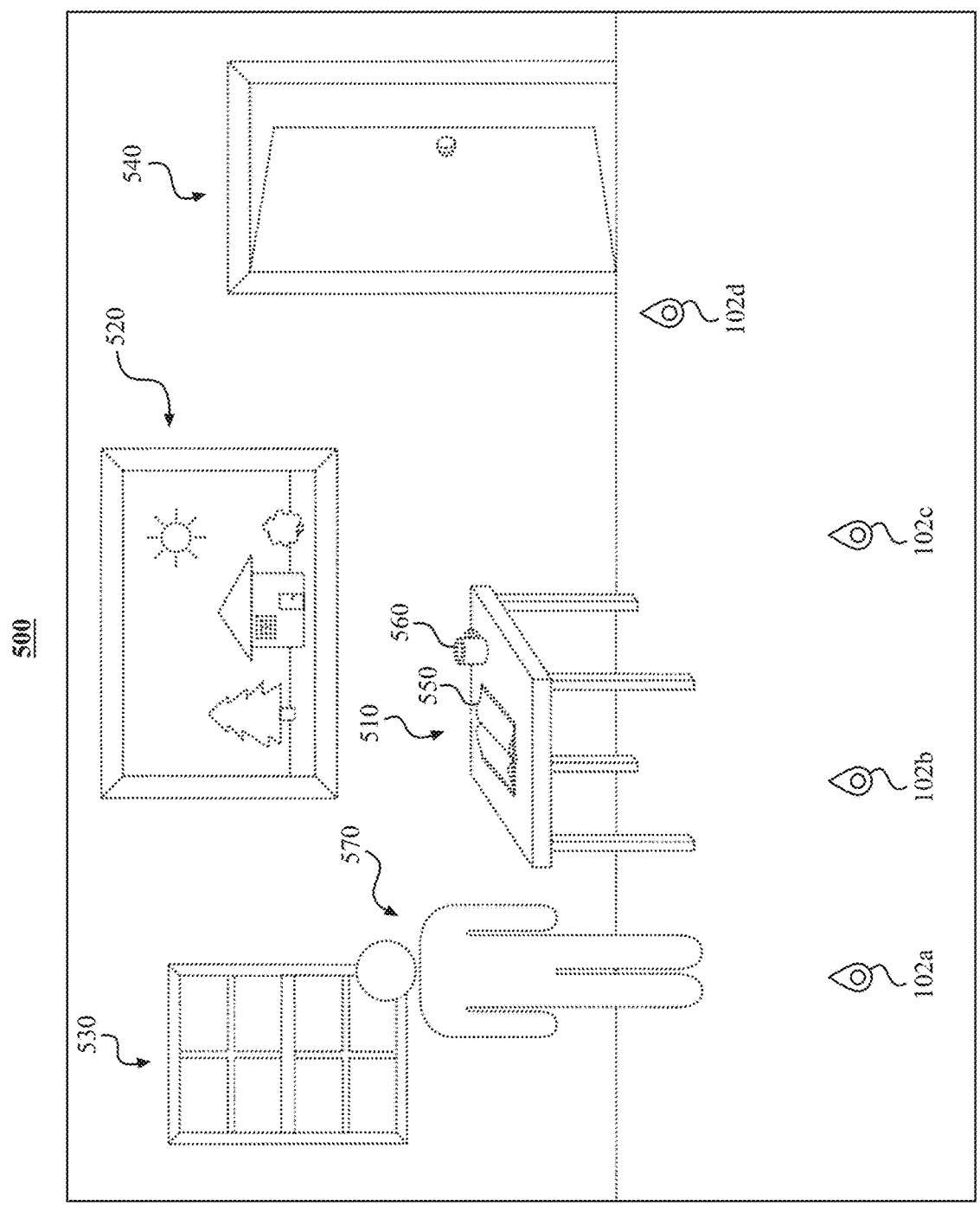
FIG. 5 illustrates another example of expected landmarks of a landmark database in accordance with particular embodiments.

FIG. 5 illustrates another example of expected landmarks of a landmark database in accordance with particular embodiments. The system may identify the expected landmarks (e.g., clusters 510, 520, 530, 540, 550, 560, and 570) from the viewpoint at the location 102c based on the landmark database, and compare them with the detected clusters 420, 430, 440, and 470 in FIG. 4. The clusters 550, 560, and 570 associated with the notebook, the mug, and the visitor were detected and added to the landmark database in a previous tracking session (e.g., the tracking session at the location 102a or 102b).

When certain expected landmarks are unobservable from the current viewpoint, the system may determine whether the non-observable expected landmarks should be deleted from the landmark database. The determination may be based on variety of factors. For example, the semantic information associated with the non-observable expected landmarks may need to meet one or more predetermined criteria in order for those non-observable landmarks to be deleted from the database. For example, using the semantic information, the system may determine that the landmarks are associated with reliable objects (e.g., fixtures or unremovable objects) by the labels assigned to the landmarks (e.g., the window). And the landmarks labeled as the reliable landmarks (e.g., the window) may be kept in the database because the associated objects are less likely to be removed and may only be temporarily occluded by other objects. The landmarks labeled as the unreliable landmarks (e.g., the mug) may be deleted from the database because the associated objects are more likely to have been removed from the environment. In particular embodiments, if the landmarks are continuously unobservable for more than a predetermined duration (e.g., five, ten, or twenty seconds), the system may infer that the associated object no longer exists in the environment or is occluded by other objects (rather than being occluded temporarily by a moving object, such as the user's hand or another person).

In particular embodiments, the system may further access the semantic information of the unobservable but expected landmarks and use that semantic information to determine that the unobservable but expected landmarks are reliable landmarks associated with reliable objects, as indicated by the labels of those landmarks. The labels of those landmarks may be assigned by a semantic system using a trained deep-learning model, according to particular embodiments. The deep-learning model may be trained to recognize and segment objects in images. For example, the machine-learning model may be a neural network (e.g., convolutional neural network, recurrent neural network, or any other suitable machine-learning model). The machine-learning model may be trained using supervised learning, in particular embodiments. For example, each training image used for training may have bounding boxes or pixel masks that identify which regions or pixels in the image correspond to objects. The bounding boxes or masks may also be labeled with semantic information that identifies the corresponding objects (e.g., identifying an object as a table, door, book, furniture, non-furniture, reliable, or un-reliable, etc.). Once trained, the machine-learning model may process an input image captured by a camera and output semantic information that identify objects captured in the image. The semantic information associated with the image may then be used to label landmarks (e.g., corners or edges of the table, door, etc.) detected in the image. For example, the landmarks associated with the table, the mug, and the notebook may be labeled as unreliable landmarks, while the landmarks associated with the window, the painting and the door may be labeled as reliable landmarks. The labels of the landmarks may be associated with predetermined reliability scores indicating the likelihood that the associated objects may be removed. For example, the reliability score associated the label of "window" may be higher than the reliability score associated the label of "painting on the wall," since the likelihood of removing the window is less than the likelihood of removing the painting. The reliability score associated the label of "table" may be higher than the reliability score associated the label of "mug", although they both are associated with unreliable objects.

As previously described, landmarks stored in the landmark database may be updated to keep the landmark database current. One way to do this is to remove expected landmarks that are currently unobservable. The threshold criteria for removing expected landmarks may depend on the landmark's semantic information. For example, reliable landmarks that are associated with fixtures or furniture are less likely to be removed, whereas unreliable landmarks that are associated with personal objects and living things are more likely to be removed. In particular embodiments, the system may determine to delete the unobservable reliable landmarks, because they would not be observable for a long time and not worth to be tracked. For example, in a crowded classroom full of students, some of the fixtures (e.g., the backpack hooks on the wall) in the classroom may be constantly occluded and not observable. The system may determine to delete the landmarks associated with the occluded fixtures, since the system may determine that the backpack hooks on the wall are not observable until the students leave the classroom in forty-five minutes. Although the fixtures are still in the classroom, it is not worth to track them for a certain period of time (e.g., forty-five minutes). As an example but not by way of limitation, the system may determine to delete the unobservable landmarks based on one or more of criteria, or combination of the one or more criteria.

As shown in FIG. 4, the expected landmarks of the table, the mug, and the notebook are not observable from the viewpoint at the location 102c, since the crowd of visitors block the table and objects on the table. The system may determine whether the landmarks associated with the table, mug or the notebook need to be deleted from the landmark database using variety methods. In particular embodiments, the system may first re-localize the user within the environment and determine that he is located at location 102c. Based on the localization results, the system may access the landmark database and retrieve the landmarks that are expected to be observable from location 102c. In this example, the system may determine that landmarks associated with the table, mug, and notebook are expected to be observable at location 102c, but they are currently not observable in the image as they are being occluded by the group of people 470. The system may determine whether the unobservable but expected landmarks are reliable landmarks or unreliable landmarks using their associated semantic information. In this scenario, the system may determine to delete the landmarks of the mug and notebook from the landmark database, since the landmarks of the mug and notebook are unreliable landmarks associated with lower reliability scores and more likely to be removed from the scene. The system may determine not to delete the landmarks of the table from the landmark database, since the landmarks associated with the table has a higher reliability score than those of the mug and notebook.

In particular embodiments, the system may need to decide whether the unobserved unreliable landmarks (e.g., the mug and notebook) are temporarily unseen from a certain viewpoint, or permanently removed from the scene. The system may associate timestamps with detected landmarks in each tracking session. By monitoring the timestamps of the tracking sessions, the system may calculate how long the expected landmarks have not be observable. If the expected landmarks have not been observable for a few continuous tracking sessions or for a certain period of time, the system may determine that the object associated with the landmarks (e.g., a painting on the wall) has been removed or not worth to track. A predefined threshold number of tracking sessions or a predefined threshold period of time that the expected landmarks have not been observed may be set by the system. The system may use the predefined threshold number of tracking sessions or the predefined threshold period of time to determine whether to delete the unobservable expected landmarks.

In an example scenario, the unobservable expected landmarks associated with the mug and notebook are not observable for five continues tracking sessions, and the predefined threshold number of tracking sessions before landmark removal is four. The system may determine that landmarks associated with the mug and the notebook may be deleted from the landmark database, since the number of unobservable tracking sessions exceeds the predefined threshold number of tracking sessions. Additionally, the system may adjust the predefined threshold number of tracking sessions in accordance with the change of the scene for optimizing the tracking procedure.

In another example scenario, the unobservable landmarks of the mug and notebook are not observable continuously for eleven seconds, and the predefined threshold period of time before landmark removal is ten seconds. The system may determine that landmarks associated with the mug and the notebook may be deleted from the landmark database, since the time of unobservable tracking sessions exceeds the predefined threshold period of time. Additionally, the system may adjust the predefined threshold period of time in accordance with the change of the scene for optimizing the tracking procedure.

In particular embodiments, a predefined target density of landmarks can be used to determine whether to delete the unobservable landmarks, wherein the target density of the landmarks is the maximum number of landmarks that can be tracked in the feature map. When the number of the landmarks tracked in the feature map is over the target density, the system may delete the unobservable expected landmarks from the landmark database or lower the threshold requirement for deleting landmarks (e.g., from a threshold of two hundred to one hundred fifty). In one example scenario, the predefined target density may be two hundred and the number of the landmarks tracked in the feature map may be two hundred and ten. The system may determine that landmarks associated with the mug and the notebook may be deleted from the landmark database, since number of tracked landmarks is exceeding the predefined target density. Additionally, the system may adjust the predefined target density in accordance with the change of the scene for optimizing the tracking procedure.

Certain types of landmarks may be more detectable than others. For example, corners may be more detectable than lines, and lines may be more detectable than planes. Based on landmark types, detectability strength may be assigned to the landmarks. In particular embodiments, a predefined strength priority threshold may be used to determine whether to delete the unobservable landmarks, wherein the predefined strength priority threshold is the minimum strength of the unobservable landmarks that may be retained in the landmark database. Each type of landmarks may be assigned with a strength. For example, corners may have a higher strength than the lines, and lines may have a higher strength than planes, etc. In particular embodiments, when the system decides to reduce the number of landmarks in the database (e.g., when the number of landmarks has exceeded a threshold density), it may do so based on the strengths of the landmarks. For example, when the strengths of the unobservable landmarks are under the predefined strength priority threshold, the system may delete the unobservable expected landmarks from the landmark database. For example, if the predefined strength priority threshold is three and the strengths of the unobservable landmarks are two (e.g., the strength of a line) and three (e.g., the strength of a corner), the system may determine that unobservable landmarks of the lines may be deleted from the landmark database, and the unobservable landmarks of the corners may be retained in the landmark database. Additionally, the system may adjust the predefined strength priority threshold in accordance with the change of the scene for optimizing the tracking procedure.

In particular embodiments, semantic information may be used to distinguish reliable landmarks and unreliable landmarks, which in turn may be used to determine whether to remove or when to remove unobservable landmarks from the landmark database. Using the semantic information includes using image-based semantic segmentation, assigning semantic labels to landmarks, and aggregation of the labels for each landmark. The semantic information, such as the labels assigned to the landmarks, can be categorized as reliable or unreliable labels. The reliable labels may be assigned to the landmarks that are associated with objects that are less likely to be moved (e.g., walls, ceilings, or floors). The unreliable labels may be assigned to the landmarks that are associated with objects that are more likely to be moved (e.g., persons, carts, chairs, or books). Based on the semantic information, the system may correlate the labels with the landmarks, accurately and promptly determine that the unobservable landmarks are reliable landmarks or unreliable landmarks, and further determine whether to delete the unobservable landmarks from the landmark database. As an example and not by way of limitation, the system may use a trained deep-learning model to label the landmarks using the semantic information.

A deep-learning model may be used to assign semantic labels to landmarks. The deep-learning model may be trained to process an image and identify portions of the image that correspond to objects of interest (e.g., table, wall, ceiling, fixtures, cups, books, etc.) with training data. Based on the identifications, the landmarks (e.g., the geometry elements including planes, lines, or points) are found within the same portions of the image may be labeled as such (e.g., landmarks found in a portion of the image that corresponds to a book may be labeled as being associated with a book). In particular embodiments, the system may assign a label to each landmark in each session using the trained deep-learning model, and may aggregate all the labels assigned to a particular landmark in all the sessions to determine the most likely label. For example, the deep-learning model may be trained to assign a label "table" to a landmark cluster associated with a table. When the detected cluster 210 of FIG. 2 is detected by the system, the deep-learning model may assign the label "table" to the landmarks of the detected cluster 210, since the landmarks of the cluster 210 may be similar to the training landmarks of a table.

In particular embodiments, different labels may be assigned to a particular landmark from different viewpoints or at different time. The system may aggregate all the labels assigned to that landmark, determine which label is the most likely label and assign the most likely label to that landmark. In particular embodiments, the system may count the number that each label is assigned to the landmark, and choose the label having the highest count as the most likely label, and assign that label to the landmark.

As an example and not by way of limitation, a landmark (e.g., a corner) may be assigned a label "table" from one viewpoint and a label "chair" from another viewpoint in different tracking sessions. The system may aggregate the labels of "table" and "chair" assigned to that landmark, and count the number for each assigned label. In twenty tracking sessions, the label of "table" may be assigned in fifteen sessions, and the label of "chair" may be assigned in five sessions. The system may determine that the label of "table" is the most likely label for that particular landmark (e.g., the corner), and assign the label of "table" to the landmark. The system may use other methods to determine the most likely label for the landmark as well.

In particular embodiments, the system may perform a re-localization procedure to determine the relative position of a user device (e.g., a smart phone or a VR/AR headset) within an environment (e.g., the scene 100 of FIG. 1). The re-localization may be performed when the user initiates the tracking application, or when the system determines that it may have lost tracking of landmarks. During the re-localization procedure, the system may analyze the pattern of detected landmarks (e.g., the pattern 200 of FIG. 2), search the landmark database to find a fully or partially matched pattern of landmarks (e.g., the pattern 300 of FIG. 3), and determine the viewpoint of the user/camera based on the matched landmarks.

In particular embodiments, the landmarks may be detected by images captured by built-in sensors or components of a mobile device (e.g., smart phones or AR/VR headsets). The built-in sensors and components may comprise cameras and motion sensors including an accelerometer, a compass, an altimeter, a gyroscope, or any other sensors that are suitable to sense the movement of the mobile device. In other particular embodiments, the landmarks may be detected by inertial sensors or depth sensors of the environment. As an example and not by way of limitation, when used as a base-station for tracking (e.g., Rift or Portal), the environment may be equipped with sensors at multiple locations, such as the locations 102*a*-102*d* in FIG. 1, the detected landmarks (e.g., the clusters 210, 220, 230, 240, 20, 260, or 270 in FIG. 2) may be associated with the locations and/or timestamps when the landmarks are detected, and the pattern 200 may be formed based on the detected landmarks.

The landmarks saved in the landmark database may be indexed with respect to locations and/or timestamps. In particular embodiments, the landmarks may be detected by an image captured at a location by a camera, and all the landmarks detected by that image may be indexed with respect to that location. In particular embodiments, the landmarks may be detected by more than one device or sensor at respective locations. Each of the landmarks may be associated with the time when the landmarks were detected. The system may aggregate all the landmarks detected from different components with respect to a particular time and index them accordingly. A pattern (e.g., the pattern 300) of the landmarks (e.g., the clusters 310, 320, 330, and 340) in the landmark database corresponding to a particular location (e.g., one of locations 102*a*-102*d* in FIG. 3) or a particular timestamp may be recognized by the system during the search.

When the pattern 200 of the detected landmarks sufficiently matches the pattern 300 of landmarks in the landmark database (e.g., the system finding a transformation function that can map a threshold portion of the detected landmarks with the expected landmarks in the landmark database), the system may compute the current location of the user device within the environment based on the transformation function. However, in some scenarios, the pattern of the detected landmarks may not sufficiently match the landmarks found in the landmark database. For example, the window and door may be partially unobservable or blocked by other objects in the environment. Thus, the detected landmarks of the window and door (e.g., the clusters 230 and 240 in FIG. 2) may only partially match the indexed landmarks of the window and door in the landmark database (e.g., the clusters 330 and 340). By analyzing the partially matched patterns, the system may determine that the partially matched patterns are accurately matched with each other because the un-matching portions are only unobservable temporarily.

As an example and not by way of limitation, when a matched pattern (e.g., the pattern 300) of landmarks is found in the landmark database, the system may determine that the location corresponding to the matched indexed landmarks as the current location of the user device from where the detected landmarks are captured (e.g., the locations 102a). The system may start tracking sessions from the determined initial location (e.g., the location 102a), and subsequent locations of the user device in the subsequent tracking sessions may be estimated based on the initial location and motion information of the user device.

In particular embodiments, the system may estimate the user's next positions, including locations and orientations, at a subsequent time based on the current location, pose and velocity of the user device. The user device (e.g., a smartphone or AR/VR headset), may be equipped with motion sensors, such as an accelerometer, a compass, an altimeter, a gyroscope, a magnetometer, or any other sensors that are suitable to sense the movement of the mobile device. The system may use the motion information sensed by the motion sensors and/or images captured by the camera to determine user's current moving direction and speed, and estimate a subsequent location (e.g., location 102b) of the user at a predetermined time interval (e.g., every one second, three second, etc.) without conducting a re-localization procedure based on a comparison of the detected landmarks with landmarks in the landmark database, which is computationally expensive.

By estimating the user's subsequent location using motion information detected by the motion sensors of the user device, the system may determine the expected landmarks with respect to the subsequent location promptly and more efficiently.

After the initial user location is determined by the re-localization, the system may estimate the subsequent user locations based on the user's current location and user device velocity information. However, there may be discrepancies between the estimated locations and the user's real locations. Over time, the discrepancies may be accumulated to a certain degree that the system may fail to track the landmarks in the scene. For example, the system may estimate the user is at a subsequent location 102c in FIG. 4 at the time t. However, the user's real location is at 102c' in FIG. 4 at the time t. The system may compare the expected landmarks from the viewpoint at the location 102c with the detected landmarks from the viewpoint at the location 102c'. Comparison of the detected landmarks at the location 102c' and the expected landmarks at the location 102c may reveal a mismatch between the two sets of landmarks. If the mismatch continues (e.g., continues for more than a threshold duration, such as three, five, or ten seconds), the system may determine that the tracking has failed. Consequently, the system may perform a re-localization procedure to correct the drifted user location.

Figure 6:
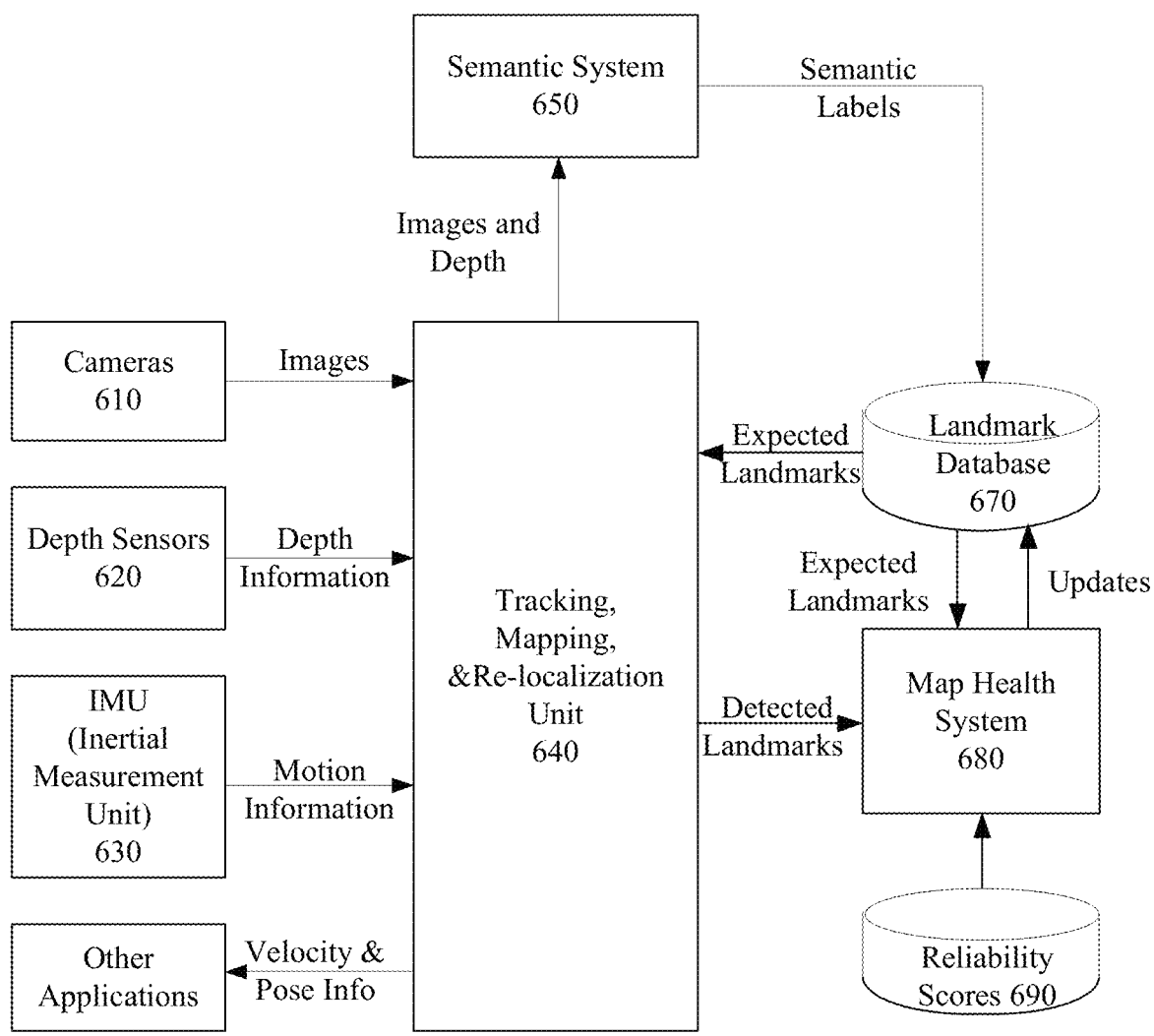
FIG. 6 illustrates an example of a block diagram of a tracking system in accordance with particular embodiments.

FIG. 6 illustrates an example of a block diagram of a tracking system in accordance with particular embodiments. The tracking system 600 utilizes a map health system that is configured to keep the landmark database up-to-date. As previously described, the feature map stored in the landmark database can be used to perform object tracking or mapping, and/or re-localization within the environment. A feature map that has up-to-date landmarks (e.g., no stale landmarks in the feature map) can improve the performance of the system, such as a faster tracking or re-localization speed and better accuracy. The faster tracking speed may result from avoiding tracking stale landmarks (e.g., the landmarks that no longer exist), and the improved accuracy may result from reducing the interference from the stale landmarks.

The tracking system 600 shown in FIG. 6 may comprise cameras 610, depth sensors 620, an Inertial Measurement Unit (IMU) 630, a tracking unit 640, a semantic system 650, a landmark database 670, and a map health system 680. The tracking system 600 may comprise other components (e.g., a reliability score database 690) or interact with other functional components or systems (e.g., other applications).

In particular embodiments, the tracking system 600 or an application may capture image data of an environment using a camera (e.g., one of the cameras 610), which may be a camera of a mobile device (e.g., a smartphone or AR/VR headset). The captured image data may be provided to the tracking unit 640, and depth information of the objects in the environment may be computed based on the image data. The depth information may also be detected by the depth sensors 620. The image data captured by the cameras 610 and the corresponding depth information may be forwarded to the semantic system 650 by the tracking unit 640, where the semantic system 650 may output semantic information corresponding to segments of the image data.

The semantic system 650 may process the received image data and the depth information to recognize the objects captured in the image data, and determine semantic information (e.g., labels) for the image segments. The semantic system 650 may use a trained deep-learning model to process the image data, identify segments of the images, and assign semantic labels to the identified image segments. The semantic labels then may be provided to the landmark database 670, where the semantic labels may be correlated with the associated landmarks (e.g., the semantic labels may be assigned to the landmarks corresponding to the same image segments.)

The tracking unit 640 may coordinate operations of components of the system 600 to perform certain functionalities (e.g., tracking, mapping, or re-localization). The tracking unit 640 receives the image data and related information from the sensor components (e.g., the cameras 610, depth sensors 620, and IMU 630). The image data and the depth information may be forwarded to the semantic system 650 for labeling the segments of the images. The tracking unit 640 may use the motion information detected by the IMU 630 to obtain device pose and velocity information (e.g., the pose or orientation of an AR/VR headset or a smartphone), and use the device pose and velocity information for tracking, mapping, or re-localization operations. For example, the tracking unit 640 may detect landmarks from the captured images, and use the detected landmarks for retrieving the corresponding location information during the re-localization. The tracking unit 640 may use the location information and the device pose and velocity information to estimate subsequent locations of the user device during the subsequent tracking sessions. The detected landmarks and their location information may be provided to the map health system 680 for updating the landmark database 670.

The landmark database 670 is a database containing all the landmarks in the feature map of an environment, and the locations and/or timestamps associated with the landmarks. In particular embodiments, the landmark database 670 may also comprise semantic information associated with the landmarks. The landmark database 670 may receive the semantic labels from the semantic system 650, and correlate the labels with the landmarks stored in the database (e.g., assign the semantic labels to the landmarks corresponding to the same image segments.) The landmark database 670 may be updated by the map health system 680 based on the currently detected landmarks and expected landmarks. The landmarks in the database 670 may be indexed with respect to the locations where the landmarks were detected, and/or the timestamps when the landmarks were detected. The landmark database 670 may receive a pattern of the detected landmarks from the tracking unit 640, and search for a matching pattern of indexed landmarks in the database 670. If a matching pattern of indexed landmarks is found in the landmark database 670, the corresponding indexed landmarks may be returned to the tracking unit 640, and the location associated with the matching indexed landmarks may be determined as the user's current location by the tracking unit 640. In particular embodiments, the landmark database 670 may receive a location or a timestamp from the tracking unit 640, such as an estimated subsequent location or time, and determine the expected landmarks with respect to the received location or time information. The expected landmarks may also be provided to the map health system 680. Based on the received expected landmarks and the detected landmarks, the map health system 680 may determine how to update the landmark database 670, and provide update instructions to the landmark database 670 base on the determination.

The map health system 680 may receive detected landmarks from the tracking unit 640 and the expected landmarks from the landmark database 670. The map health system 680 may compare the detected landmarks and expected landmarks to determine that the expected landmarks are observable. If any of the expected landmarks are unobservable, the map health system 680 may determine that the unobservable landmarks should be deleted from the landmark database 670, when the semantic information of the landmarks meet certain criteria. In particular embodiments, the map health system 680 may determine to delete or retain the unobservable landmarks based on reliability scores associated with the landmarks, wherein the reliability scores may be provided by the reliability score database 690. The semantic labels of the landmarks are associated with predetermined reliability scores indicating the likelihood that the associated objects may be removed. If any of the detected landmarks are not included in the landmark database 670, the map health system 680 may determine to add the newly detected landmarks to the landmark database 670. The map health system 680 may generate and provide instructions to the landmark database 670 for updating.

As an example and not by way of limitation, the tracking system 600 may comprise other functional components that are suitable to perform the described functionalities. Using the semantic information, the system may update the landmark database promptly and efficiently, result in an improved performance and reduction of power consumption of the tracking system using the landmark database, especially for the applications run on the mobile devices.

Figure 7:
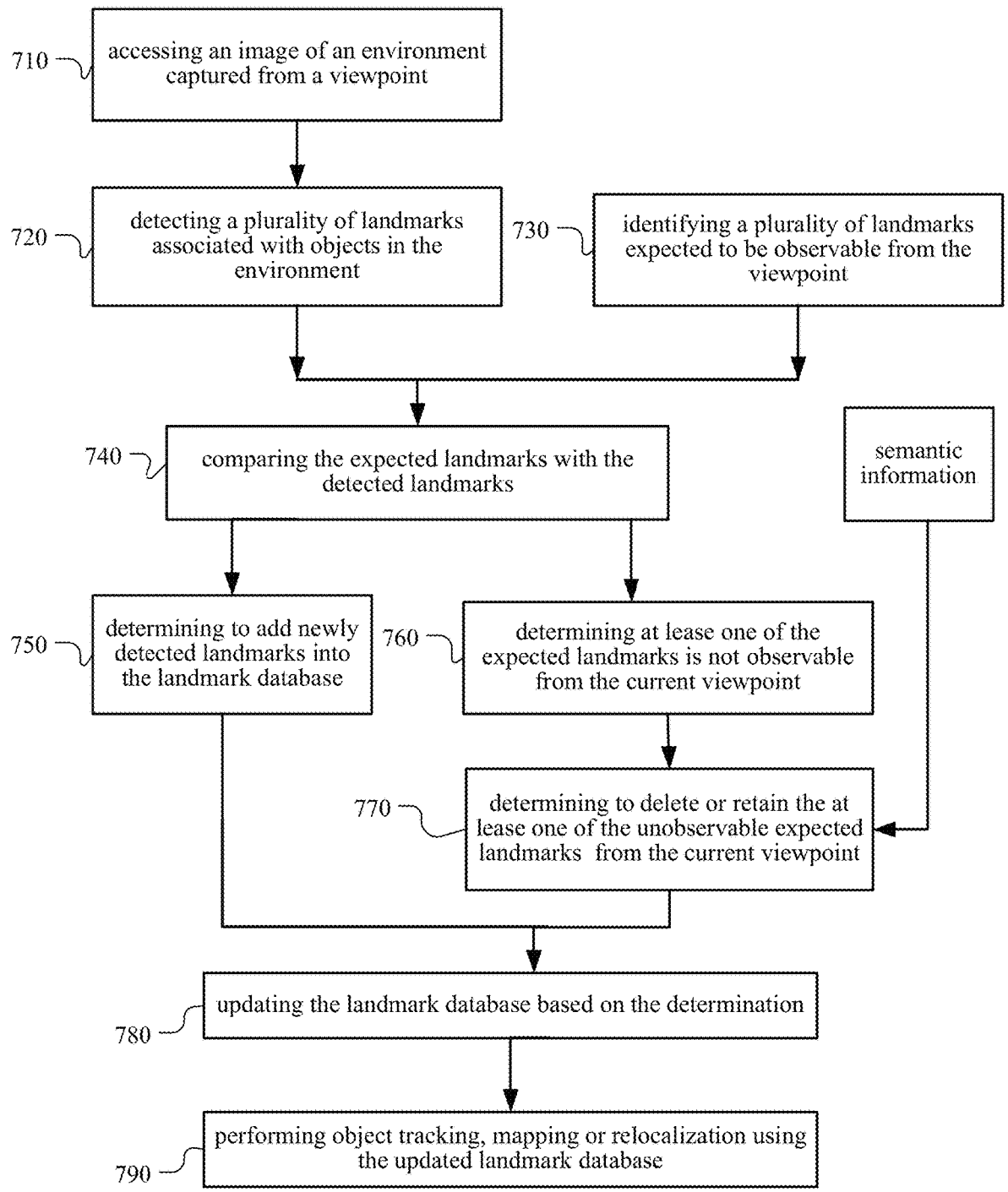
FIG. 7 illustrates an example method for tracking an environment in further embodiments.

FIG. 7 illustrates an example method for tracking an environment in further embodiments. The method 700 may comprise steps of detecting landmarks in an environment, updating a landmark database using semantic information associated with the landmarks, and conducting certain functionalities using the updated landmark database.

In particular embodiments, the method 700 may start from accessing an image of an environment captured from a viewpoint at a step 710. The image may be captured by a camera on a user device such as a smartphone or an AR/VR headset, and may comprise a photo or video. The image data may be processed to identify objects in the environment.

In a step 720, the captured image may be processed to detect a plurality of detected landmarks, those detected landmarks may be associated with the objects in the environment. In particular embodiments, the landmarks may be detected by the sensors. The landmarks may comprise geometry elements including lines, corner, points, or meshes associated with the objects identified in the environment. The detected landmarks may be associated with a viewpoint at a location where the landmarks are detected, and/or a timestamp when the landmarks are detected.

In a step 730, a plurality of landmarks that are expected to be observed with respect to the same viewpoint may be determined based on a landmark database. The landmarks in the landmark database may be indexed with respect to locations where the landmarks were detected and/or timestamps when the landmarks were detected. Given a viewpoint or a timestamp, the landmark database may determine the landmarks that are expected to be observable at that viewpoint or timestamp. The expected landmarks may be provided for comparison with the detected landmarks.

In a step 740, the landmarks detected in the step 720 may be compared with the expected landmarks determined in the step 730. Based on the comparison results, the system may determine whether the expected landmarks are currently observable, or the detected landmarks are existed in the landmark database.

In a step 750, the system may determine that at least one of the detected landmarks is not included in the expected landmarks based on the comparison results from the step 740. The system may generate an instruction of adding the newly detected landmarks to the landmark database, and send the instruction to the landmark database for updating.

In a step 760, the system may determine that at least one of the expected landmarks is currently not observable based on the comparison results from the step 740. The system may further determine that the unobservable expected landmark should be deleted from or retained in the landmark database based on the semantic information (e.g., semantic labels and/or reliability scores) associated with the landmarks, in a step 770. If the system determines that the unobservable expected landmark is permanently unobservable (e.g., the corresponding object has been removed from the environment) or not worth to be tracked (e.g., expected to be unseen for a long time), the unobservable expected landmark may be deleted from the landmark database. The system may generate an instruction of deleting the unobservable expected landmark from the landmark database, and send the instruction to the landmark database for updating. If the system determines that the unobservable expected landmark is merely temporarily unobservable, the unobservable expected landmark may remain in the landmark database.

In a step 780, the system may execute the instructions generated in the step 750 or 770 and update the landmark database accordingly. The landmark database may be updated by adding newly detected landmarks or deleting stale landmarks. This updating procedure may be performed periodically. As an example and not by way of limitation, the landmark database may be updated every tracking session, every two tracking sessions, or any intervals that are predefined by the system.

In a step 790, the system may perform certain functionalities of the tracking system 600, including but not limited to, tracking or mapping objects in an environment, or re-localizing the user device, using the up-to-date landmark database. As an example and not by way of limitation, the up-to-date landmark database may be provided to other applications or systems to perform other functionalities as well.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for tracking an environment including the particular steps of the method of FIG. 7, this disclosure contemplates any suitable method for tracking an environment including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
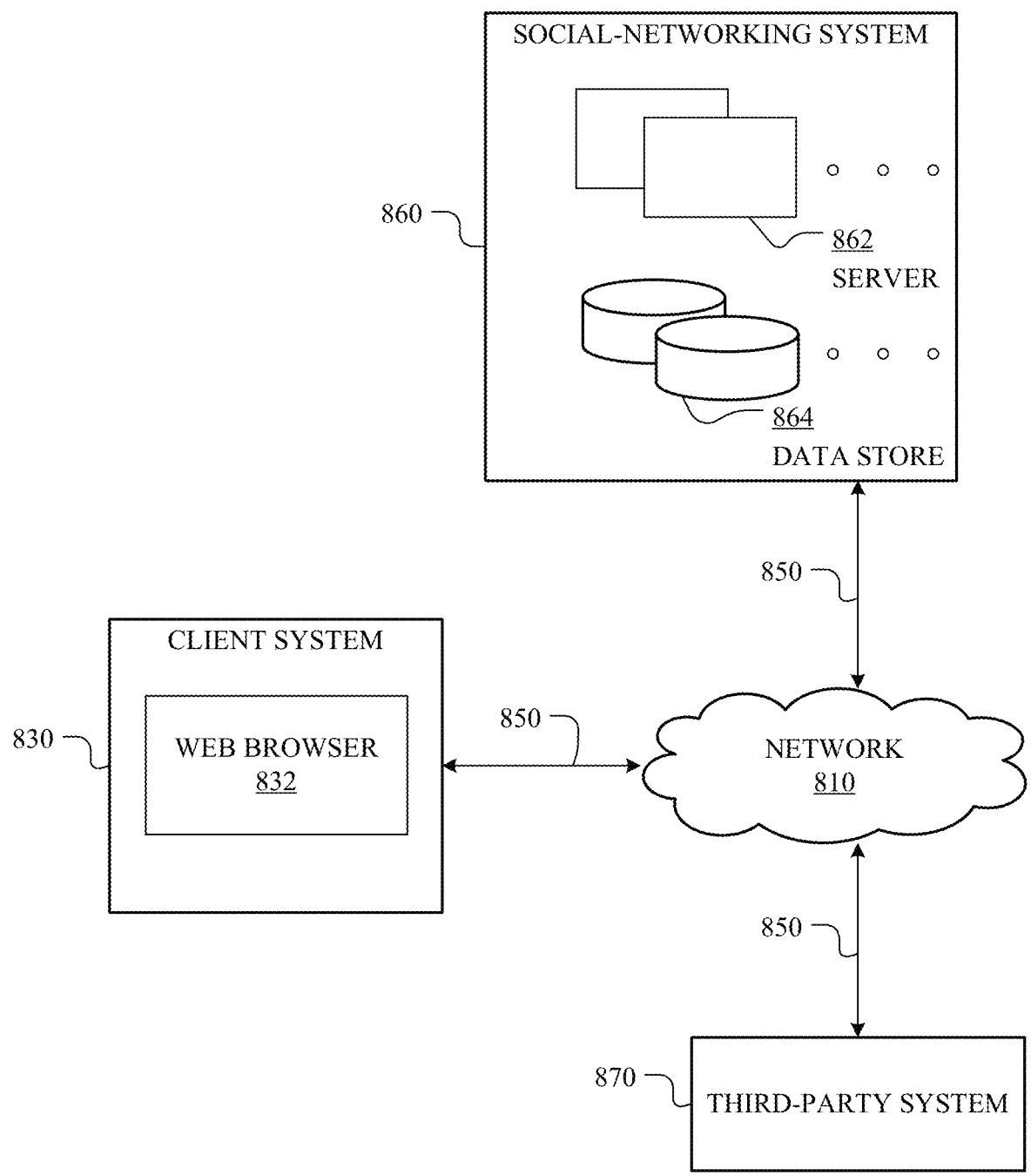
FIG. 8 illustrates an example network environment associated with a social-networking system.

FIG. 8 illustrates an example network environment 800 associated with a social-networking system. Network environment 800 includes a client system 830, a social-networking system 860, and a third-party system 870 connected to each other by a network 810. Although FIG. 8 illustrates a particular arrangement of client system 830, social-networking system 860, third-party system 870, and network 810, this disclosure contemplates any suitable arrangement of client system 830, social-networking system 860, third-party system 870, and network 810. As an example and not by way of limitation, two or more of client system 830, social-networking system 860, and third-party system 870 may be connected to each other directly, bypassing network 810. As another example, two or more of client system 830, social-networking system 860, and third-party system 870 may be physically or logically co-located with each other in whole or in part. Moreover, although FIG. 8 illustrates a particular number of client systems 830, social-networking systems 860, third-party systems 870, and networks 810, this disclosure contemplates any suitable number of client systems 830, social-networking systems 860, third-party systems 870, and networks 810. As an example and not by way of limitation, network environment 800 may include multiple client system 830, social-networking systems 860, third-party systems 870, and networks 810.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 800. One or more first links 850 may differ in one or more respects from one or more second links 850.

In particular embodiments, client system 830 may be an electronic device including hardware, software, or embedded logic components or a combination of two or more such components and capable of carrying out the appropriate functionalities implemented or supported by client system 830. As an example and not by way of limitation, a client system 830 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 830. A client system 830 may enable a network user at client system 830 to access network 810. A client system 830 may enable its user to communicate with other users at other client systems 830.

In particular embodiments, client system 830 may include a web browser 832, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 830 may enter a Uniform Resource Locator (URL) or other address directing the web browser 832 to a particular server (such as server 862, or a server associated with a third-party system 870), and the web browser 832 may generate a Hyper Text Transfer Protocol (HTTP) request and communicate the HTTP request to server. The server may accept the HTTP request and communicate to client system 830 one or more Hyper Text Markup Language (HTML) files responsive to the HTTP request. Client system 830 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 860 may be a network-addressable computing system that can host an online social network. Social-networking system 860 may generate, store, receive, and send social-networking data, such as, for example, user-profile data, concept-profile data, social-graph information, or other suitable data related to the online social network. Social-networking system 860 may be accessed by the other components of network environment 800 either directly or via network 810. As an example and not by way of limitation, client system 830 may access social-networking system 860 using a web browser 832, or a native application associated with social-networking system 860 (e.g., a mobile social-networking application, a messaging application, another suitable application, or any combination thereof) either directly or via network 810. In particular embodiments, social-networking system 860 may include one or more servers 862. Each server 862 may be a unitary server or a distributed server spanning multiple computers or multiple datacenters. Servers 862 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 862 may include hardware, software, or embedded logic components or a combination of two or more such components for carrying out the appropriate functionalities implemented or supported by server 862. In particular embodiments, social-networking system 860 may include one or more data stores 864. Data stores 864 may be used to store various types of information. In particular embodiments, the information stored in data stores 864 may be organized according to specific data structures. In particular embodiments, each data store 864 may be a relational, columnar, correlation, or other suitable database. Although this disclosure describes or illustrates particular types of databases, this disclosure contemplates any suitable types of databases. Particular embodiments may provide interfaces that enable a client system 830, a social-networking system 860, or a third-party system 870 to manage, retrieve, modify, add, or delete, the information stored in data store 864.

In particular embodiments, social-networking system 860 may store one or more social graphs in one or more data stores 864. In particular embodiments, a social graph may include multiple nodes—which may include multiple user nodes (each corresponding to a particular user) or multiple concept nodes (each corresponding to a particular concept)—and multiple edges connecting the nodes. Social-networking system 860 may provide users of the online social network the ability to communicate and interact with other users. In particular embodiments, users may join the online social network via social-networking system 860 and then add connections (e.g., relationships) to a number of other users of social-networking system 860 to whom they want to be connected. Herein, the term "friend" may refer to any other user of social-networking system 860 with whom a user has formed a connection, association, or relationship via social-networking system 860.

In particular embodiments, social-networking system 860 may provide users with the ability to take actions on various types of items or objects, supported by social-networking system 860. As an example and not by way of limitation, the items and objects may include groups or social networks to which users of social-networking system 860 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 860 or by an external system of third-party system 870, which is separate from social-networking system 860 and coupled to social-networking system 860 via a network 810.

In particular embodiments, social-networking system 860 may be capable of linking a variety of entities. As an example and not by way of limitation, social-networking system 860 may enable users to interact with each other as well as receive content from third-party systems 870 or other entities, or to allow users to interact with these entities through an application programming interfaces (API) or other communication channels.

In particular embodiments, a third-party system 870 may include one or more types of servers, one or more data stores, one or more interfaces, including but not limited to APIs, one or more web services, one or more content sources, one or more networks, or any other suitable components, e.g., that servers may communicate with. A third-party system 870 may be operated by a different entity from an entity operating social-networking system 860. In particular embodiments, however, social-networking system 860 and third-party systems 870 may operate in conjunction with each other to provide social-networking services to users of social-networking system 860 or third-party systems 870. In this sense, social-networking system 860 may provide a platform, or backbone, which other systems, such as third-party systems 870, may use to provide social-networking services and functionality to users across the Internet.

In particular embodiments, a third-party system 870 may include a third-party content object provider. A third-party content object provider may include one or more sources of content objects, which may be communicated to a client system 830. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 860 also includes user-generated content objects, which may enhance a user's interactions with social-networking system 860. User-generated content may include anything a user can add, upload, send, or "post" to social-networking system 860. As an example and not by way of limitation, a user communicates posts to social-networking system 860 from a client system 830. Posts may include data such as status updates or other textual data, location information, photos, videos, links, music or other similar data or media. Content may also be added to social-networking system 860 by a third-party through a "communication channel," such as a newsfeed or stream.

In particular embodiments, social-networking system 860 may include a variety of servers, sub-systems, programs, modules, logs, and data stores. In particular embodiments, social-networking system 860 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 860 may also include suitable components such as network interfaces, security mechanisms, load balancers, failover servers, management-and-network-operations consoles, other suitable components, or any suitable combination thereof. In particular embodiments, social-networking system 860 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 860 to one or more client systems 830 or one or more third-party system 870 via network 810. The web server may include a mail server or other messaging functionality for receiving and routing messages between social-networking system 860 and one or more client systems 830. An API-request server may allow a third-party system 870 to access information from social-networking system 860 by calling one or more APIs. An action logger may be used to receive communications from a web server about a user's actions on or off social-networking system 860. In conjunction with the action log, a third-party-content-object log may be maintained of user exposures to third-party-content objects. A notification controller may provide information regarding content objects to a client system 830. Information may be pushed to a client system 830 as notifications, or information may be pulled from client system 830 responsive to a request received from client system 830. Authorization servers may be used to enforce one or more privacy settings of the users of social-networking system 860. A privacy setting of a user determines how particular information associated with a user can be shared. The authorization server may allow users to opt in to or opt out of having their actions logged by social-networking system 860 or shared with other systems (e.g., third-party system 870), such as, for example, by setting appropriate privacy settings. Third-party-content-object stores may be used to store content objects received from third parties, such as a third-party system 870. Location stores may be used for storing location information received from client systems 830 associated with users. Advertisement-pricing modules may combine social information, the current time, location information, or other suitable information to provide relevant advertisements, in the form of notifications, to a user.

Figure 9:
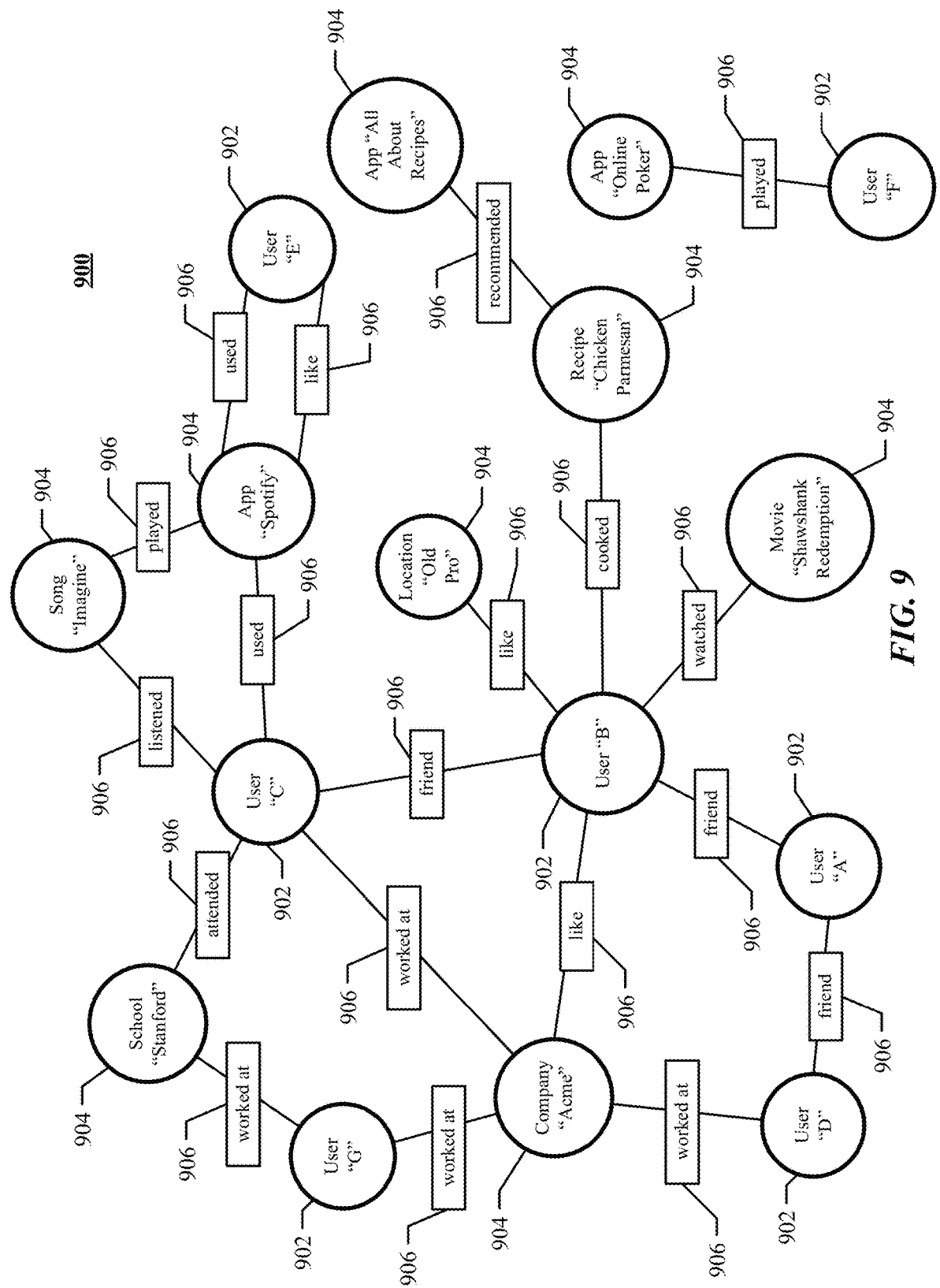
FIG. 9 illustrates an example social graph.

FIG. 9 illustrates example social graph 900. In particular embodiments, social-networking system 860 may store one or more social graphs 900 in one or more data stores. In particular embodiments, social graph 900 may include multiple nodes—which may include multiple user nodes 902 or multiple concept nodes 904—and multiple edges 906 connecting the nodes. Each node may be associated with a unique entity (i.e., user or concept), each of which may have a unique identifier (ID), such as a unique number or username. Example social graph 900 illustrated in FIG. 9 is shown, for didactic purposes, in a two-dimensional visual map representation. In particular embodiments, a social-networking system 860, client system 830, or third-party system 870 may access social graph 900 and related social-graph information for suitable applications. The nodes and edges of social graph 900 may be stored as data objects, for example, in a data store (such as a social-graph database). Such a data store may include one or more searchable or queryable indexes of nodes or edges of social graph 900.

In particular embodiments, a user node 902 may correspond to a user of social-networking system 860. As an example and not by way of limitation, a user may be an individual (human user), an entity (e.g., an enterprise, business, or third-party application), or a group (e.g., of individuals or entities) that interacts or communicates with or over social-networking system 860. In particular embodiments, when a user registers for an account with social-networking system 860, social-networking system 860 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social-networking system 860. In particular embodiments, a user node 902 may be associated with information provided by a user or information gathered by various systems, including social-networking system 860. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 860 or a third-party website associated with a web-application server); an entity (such as, for example, a person, business, group, sports team, or celebrity); a resource (such as, for example, an audio file, video file, digital photo, text file, structured document, or application) which may be located within social-networking system 860 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 904 may be associated with information of a concept provided by a user or information gathered by various systems, including social-networking system 860. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social-networking system 860. Profile pages may also be hosted on third-party websites associated with a third-party system 870. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 870. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 830 to send to social-networking system 860 a message indicating the user's action. In response to the message, social-networking system 860 may create an edge (e.g., a check-in-type edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social-networking system 860 may send a "friend request" to the second user. If the second user confirms the "friend request," social-networking system 860 may create an edge 906 connecting the first user's user node 902 to the second user's user node 902 in social graph 900 and store edge 906 as social-graph information in one or more of data stores 864. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906. The degree of separation between two objects represented by two nodes, respectively, is a count of edges in a shortest path connecting the two nodes in the social graph 900. As an example and not by way of limitation, in the social graph 900, the user node 902 of user "C" is connected to the user node 902 of user "A" via multiple paths including, for example, a first path directly passing through the user node 902 of user "B," a second path passing through the concept node 904 of company "Acme" and the user node 902 of user "D," and a third path passing through the user nodes 902 and concept nodes 904 representing school "Stanford," user "G," company "Acme," and user "D." User "C" and user "A" have a degree of separation of two because the shortest path connecting their corresponding nodes (i.e., the first path) includes two edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to an edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social-networking system 860 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 860 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social-networking system 860 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social-networking system 860 may create an edge 906 between a user node 902 and a concept node 904 in social graph 900. As an example and not by way of limitation, a user viewing a concept-profile page (such as, for example, by using a web browser or a special-purpose application hosted by the user's client system 830) may indicate that he or she likes the concept represented by the concept node 904 by clicking or selecting a "Like" icon, which may cause the user's client system 830 to send to social-networking system 860 a message indicating the user's liking of the concept associated with the concept-profile page. In response to the message, social-networking system 860 may create an edge 906 between user node 902 associated with the user and concept node 904, as illustrated by "like" edge 906 between the user and concept node 904. In particular embodiments, social-networking system 860 may store an edge 906 in one or more data stores. In particular embodiments, an edge 906 may be automatically formed by social-networking system 860 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

Figure 10:
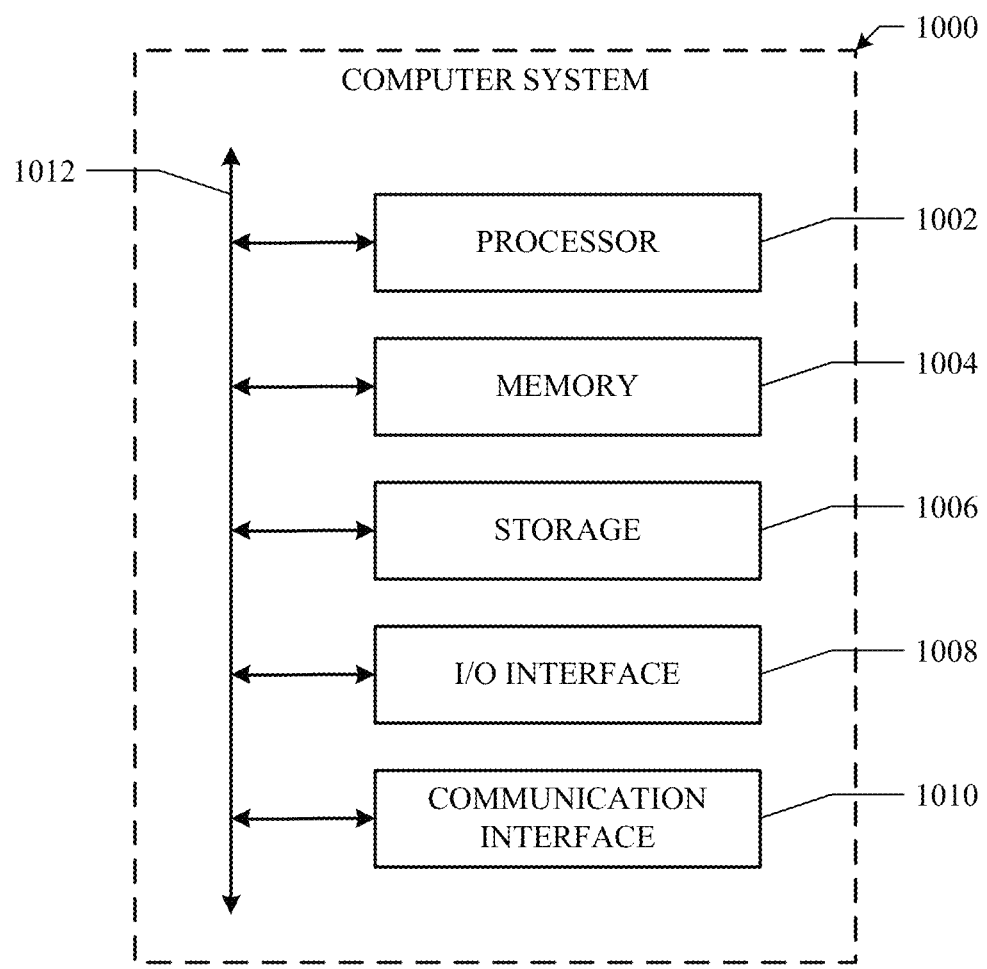
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real-time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
    during a first tracking session:
        detecting first landmarks in a first image of an environment surrounding a user; and
        determining a first location of the user by comparing the first landmarks to landmarks in a landmark database;
    during a second tracking session:
        capturing motion data using a motion sensor; and
        estimating, without using the landmark database, a second location of the user based on the motion data and the first location;
    detecting second landmarks in a second image captured from a viewpoint of the user at the second location;
    accessing, from the landmark database, expected landmarks visible from the viewpoint of the user at the second location;
    determining, based on a scoring criteria, that the estimated second location of the user is inaccurate by comparing the expected landmarks with the second landmarks; and
    re-localizing the user by comparing the landmarks in the landmark database and third landmarks detected in a third image.

2. The method of claim 1, wherein detecting second landmarks in a second image captured from a viewpoint of the user at the second location comprises:
    for each of the one or more expected landmarks visible from the viewpoint of the user at the second location, searching for a corresponding landmark within the one or more detected second landmarks in the second image.

3. The method of claim 1, wherein the scoring criteria are based on semantic information associated with the expected landmarks.

4. The method of claim 1, wherein re-localizing the user is further based on a determination that the scoring criteria exceeds a predetermined threshold.

5. The method of claim 3, wherein re-localizing the user is further based on a determination that the scoring criteria exceeds the predetermined threshold for a predetermined duration of time.

6. The method of claim 1, wherein the one or more detected landmarks comprises one or more of points, lines, planes, point cluster, or meshes.

7. The method of claim 1, wherein the landmarks in the landmark database are indexed with respect to locations or timestamps.

8. A system comprising: one or more processors and one or more computer-readable non-transitory storage media coupled to one or more of the processors, the one or more computer-readable non-transitory storage media comprising instructions operable when executed by one or more of the processors to cause the system to perform operations comprising:
    during a first tracking session:
        detect first landmarks in a first image of an environment surrounding a user; and
        determine a first location of the user by comparing the first landmarks to landmarks in a landmark database;
    during a second tracking session:
        capture motion data using a motion sensor; and
        estimate, without using the landmark database, a second location of the user based on the motion data and the first location;
    detect second landmarks in a second image captured from a viewpoint of the user at the second location;
    access, from the landmark database, expected landmarks visible from the viewpoint of the user at the second location;
    determine, based on a scoring criteria, that the estimated second location of the user is inaccurate by comparing the expected landmarks with the second landmarks; and
    re-localize the user by comparing the landmarks in the landmark database and third landmarks detected in a third image.

9. The system of claim 8, wherein the detection of second landmarks in a second image captured from a viewpoint of the user at the second location comprises:
    for each of the one or more expected landmarks visible from the viewpoint of the user at the second location, searching for a corresponding landmark within the one or more detected second landmarks in the second image.

10. The system of claim 8, wherein the scoring criteria are based on semantic information associated with the expected landmarks.

11. The system of claim 8, wherein the re-localization of the user is further based on a determination that the scoring criteria exceeds a predetermined threshold.

12. The system of claim 11, wherein the re-localization of the user is further based on a determination that the scoring criteria exceeds the predetermined threshold for a predetermined duration of time.

13. The system of claim 8, wherein the one or more detected landmarks comprises one or more of points, lines, planes, point cluster, or meshes.

14. The system of claim 8, wherein the landmarks in the landmark database are indexed with respect to locations or timestamps.

15. One or more computer-readable non-transitory storage media embodying software that is operable when executed to cause one or more processors to perform operations comprising:
   during a first tracking session:
      detect first landmarks in a first image of an environment surrounding a user; and
      determine a first location of the user by comparing the first landmarks to landmarks in a landmark database;
   during a second tracking session:
      capture motion data using a motion sensor; and
      estimate, without using the landmark database, a second location of the user based on the motion data and the first location;
   detect second landmarks in a second image captured from a viewpoint of the user at the second location;
   access, from the landmark database, expected landmarks visible from the viewpoint of the user at the second location;
   determine, based on a scoring criteria, that the estimated second location of the user is inaccurate by comparing the expected landmarks with the second landmarks; and
   re-localize the user by comparing the landmarks in the landmark database and third landmarks detected in a third image.

16. The media of claim 15, wherein the detection of second landmarks in a second image captured from a viewpoint of the user at the second location comprises:
   for each of the one or more expected landmarks visible from the viewpoint of the user at the second location, searching for a corresponding landmark within the one or more detected second landmarks in the second image.

17. The media of claim 15, wherein the scoring criteria are based on semantic information associated with the expected landmarks.

18. The media of claim 15, wherein the re-localization of the user is further based on a determination that the scoring criteria exceeds a predetermined threshold.

19. The media of claim 18, wherein the re-localization of the user is further based on a determination that the scoring criteria exceeds the predetermined threshold for a predetermined duration of time.

20. The media of claim 15, wherein the one or more detected landmarks comprises one or more of points, lines, planes, point cluster, or meshes.

* * * * *